United States Patent
Matlapudi

(10) Patent No.: US 9,316,493 B2
(45) Date of Patent: Apr. 19, 2016

(54) METHOD AND APPARATUS FOR DETERMINING GAS TURBINE DAMPENING CONE INNER DIAMETER

(71) Applicant: Praveen J. Matlapudi, Houston, TX (US)

(72) Inventor: Praveen J. Matlapudi, Houston, TX (US)

(73) Assignee: Siemens Energy, Inc., Orlando, FL (US)

( * ) Notice: Subject to any disclaimer, the term of this patent is extended or adjusted under 35 U.S.C. 154(b) by 234 days.

(21) Appl. No.: 14/105,251

(22) Filed: Dec. 13, 2013

(65) Prior Publication Data
US 2015/0168139 A1  Jun. 18, 2015

(51) Int. Cl.
| | |
|---|---|
| *G01M 15/14* | (2006.01) |
| *G01B 21/14* | (2006.01) |
| *F01D 25/28* | (2006.01) |
| *G01B 5/12* | (2006.01) |
| *F01D 5/10* | (2006.01) |

(52) U.S. Cl.
CPC .............. *G01B 21/14* (2013.01); *F01D 25/285* (2013.01); *G01B 5/12* (2013.01); *G01M 15/14* (2013.01); *F01D 5/10* (2013.01)

(58) Field of Classification Search
CPC ............ G01B 5/08; G01B 5/12; G01B 11/12; G01B 21/14; G01B 5/025; G01B 7/281; G01M 15/14
USPC ...................................... 73/112.01
See application file for complete search history.

(56) References Cited

U.S. PATENT DOCUMENTS

| | | | | |
|---|---|---|---|---|
| 1,403,156 | A * | 1/1922 | Gonzalez | G01B 5/00 33/23.02 |
| 4,451,988 | A * | 6/1984 | McMurtry | G01B 7/012 33/561 |
| 4,520,568 | A | 6/1985 | Drenner | |
| 4,521,968 | A * | 6/1985 | Wiltermood | G01B 7/125 33/286 |
| 4,821,425 | A * | 4/1989 | Currie | G01B 7/282 33/504 |
| 5,377,421 | A * | 1/1995 | Isler | G01B 3/46 33/501.3 |
| 5,711,083 | A * | 1/1998 | Bidwell | G01B 5/12 33/543 |
| 6,381,861 | B1* | 5/2002 | Deterling | G01B 5/08 33/199 R |
| 6,634,114 | B2* | 10/2003 | Bidwell | G01B 5/0004 33/542 |
| 6,868,618 | B2* | 3/2005 | Navarro | G01B 3/48 33/199 R |
| 6,931,751 | B2* | 8/2005 | LaTulippe | B25B 5/006 269/153 |
| 6,996,914 | B1* | 2/2006 | Istre | G01B 11/105 29/407.05 |
| 8,767,218 | B2* | 7/2014 | Glasenapp | G01B 11/12 345/401 |
| 2001/0029677 | A1* | 10/2001 | Bidwell | G01B 5/0004 33/542 |
| 2013/0330173 | A1* | 12/2013 | Klein | F01D 21/003 415/118 |

* cited by examiner

Primary Examiner — Freddie Kirkland, III

(57) ABSTRACT

Gas turbine engine generally ring-shaped dampening cone inner diameters, including those having spherical or other convex inner diameter surface profiles, are determined with a fixture including a displacement indicator having an axis of displacement in alignment with a locating pin. The dampening cone inner diameter surface is placed in contact with the locating pin on one side and a displacement point on the other side, so that the dampening cone inner diameter surface circumscribes a contact surface formed on the locating pin and the displacement point. The indicator displacement is correlated with the dampening cone inner diameter.

18 Claims, 4 Drawing Sheets

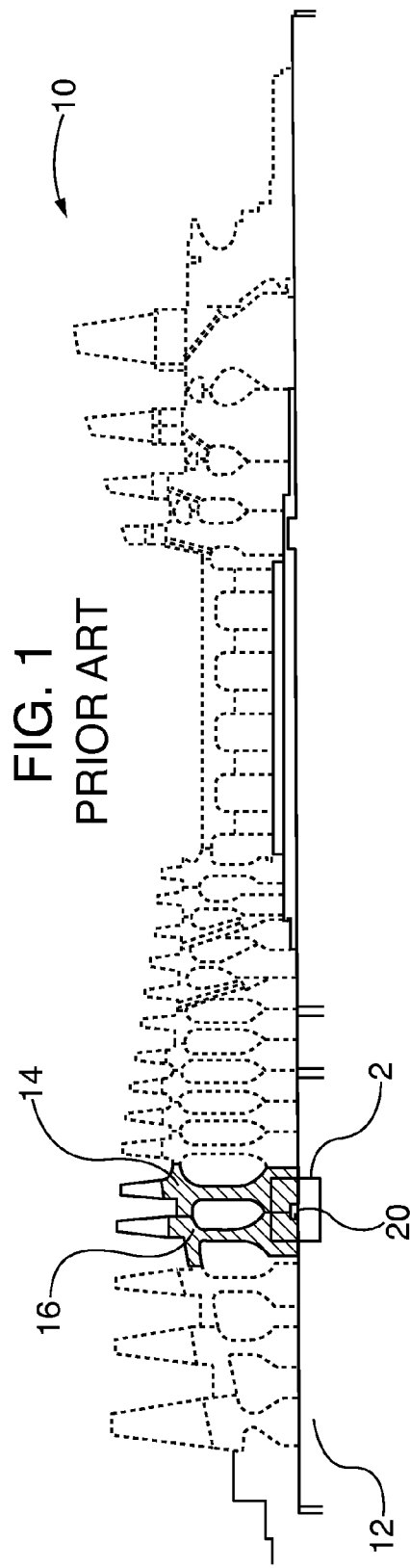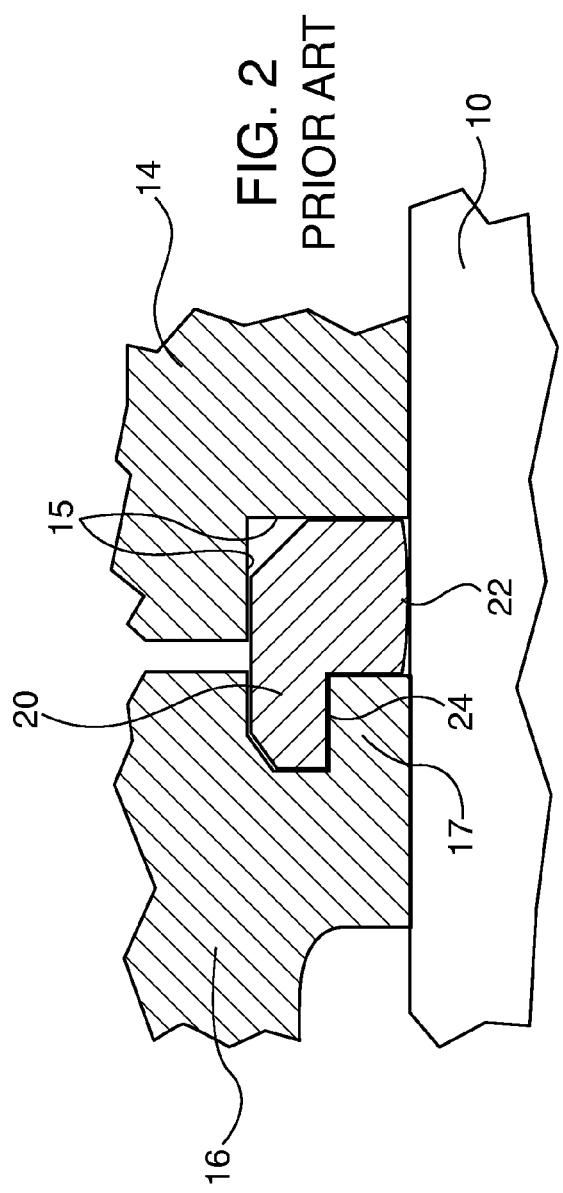

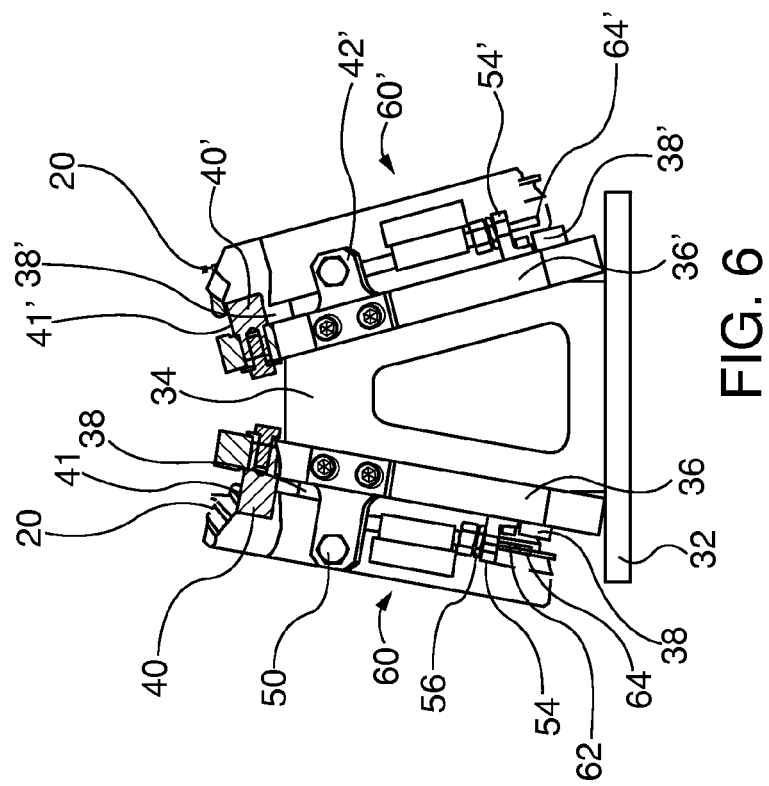
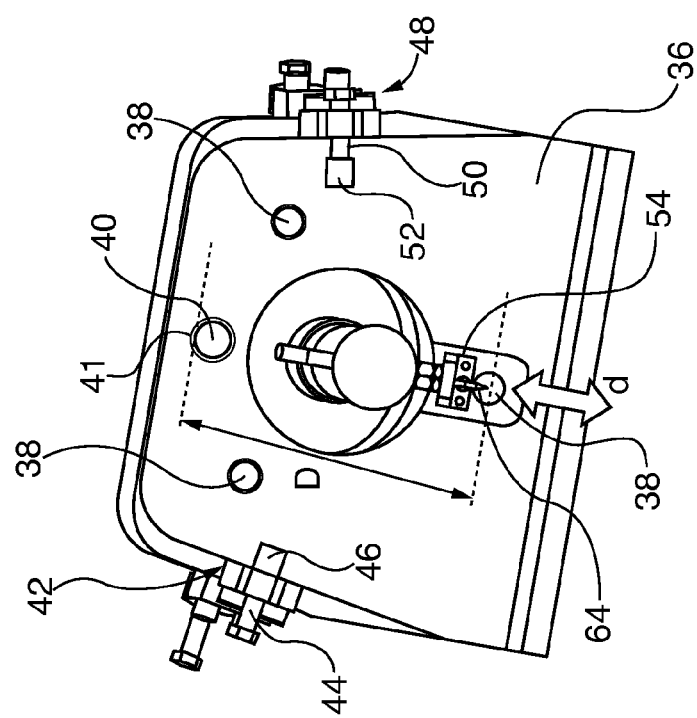

METHOD AND APPARATUS FOR DETERMINING GAS TURBINE DAMPENING CONE INNER DIAMETER

BACKGROUND OF THE INVENTION

1. Field of the Invention

The invention relates to methods and apparatus for determining a gas turbine engine generally ring-shaped dampening cone inner diameter. More particularly the invention also relates to methods and apparatus for determining the inner diameter of dampening cones having spherical or other convex inner diameter surface profiles.

2. Description of the Prior Art

Dampening cones are ring-shaped components that are interposed radially and axially between a gas turbine engine rotor tie rod and turbine disc rows to couple each row sequentially along the rotor and to maintain radial concentricity between the disc row/rotor tie rod interfaces. Due to the large diameter, axial length and rotating mass of gas turbine engines dampening cones must be precision machined with concentric inner diameters of uniform radius within tolerance specifications within tens of microns, in order to minimize rotating machinery vibration. The dampening cones often have spherical or other convex inner diameter profile surfaces, to establish a constant radius circular linear abutting contact relationship with the rotor tie rod at the peak inner surface diameter. In FIGS. 1 and 2, the gas turbine engine 10 has a rotatively mounted rotor tie rod 12 upon which are mounted adjoining, axially opposed turbine discs 14 and 16 that form corresponding turbine rows. The upstream turbine disc 16 defines a turbine disc groove 17, while the downstream turbine disc 14 defines a turbine disc shoulder 15.

As can be seen more clearly in FIGS. 2 and 4, ring-shaped dampening cone 20 defines a spherical, convex inner diameter surface 22 of relatively large radius R. The spherical radius high point 23 establishes a tangential circular line contact that circumscribes the rotor tie rod 12 and establishes the inner diameter $D_1$. The dampening cone 20 also forms an annular lip 24 of inner diameter $D_2$ that engages axially within the mating turbine disc groove 17. A shoulder 15 formed in the adjoining opposed turbine disc 14 abuts the dampening cone 20 outer surface both axially and radially to lock the dampening cone in fixed position relative to the turbine discs 14 and 16.

A known apparatus and method for determining dampening cone 20 inner diameters $D_1$ and $D_2$ is by interposing an inside micrometer across the cone surfaces forming those ring diameters. Given the relatively small tolerance variances of only tens of microns compared to ring inner diameters in the 100+ millimeter range, small tilt deviations from the true geometric where the inside micrometer ends contact the opposed ring diameter surfaces will lead to incorrect diameter readings. Correct inside micrometer orientation is also impacted by the experience of the machinist who is performing the measurements. Thus repeatable and consistent diameter determination is subject to variances in micrometer placement and individual inspector skill.

Thus, a need exists for a method and apparatus for accurately determining inside diameter of a ring-shaped gas turbine dampening cone, including dampening cones with spherical convex inside diameter profiles.

Another need exists for a method and apparatus for accurately determining whether an inside diameter of a ring-shaped gas turbine dampening cone is within component structural specifications and tolerances.

An additional need exists for a method and apparatus that facilitates determination of inside diameter of a gas turbine dampening cone with consistent inspection repeatability by an individual inspector and other human inspectors.

SUMMARY OF THE INVENTION

Accordingly, a suggested object of embodiments of the invention is to create a method and apparatus for accurately determining inside diameter of a ring-shaped gas turbine dampening cone, including one with a spherical convex inside diameter profile.

Another suggested object of embodiments of the invention is to create a method and apparatus for accurately determining whether an inside diameter of a ring-shaped gas turbine dampening cone is within component structural specifications and tolerances.

An additional suggested object of embodiments of the invention is to create a method and apparatus that facilitates determination of inside diameter of a gas turbine dampening cone with consistent inspection repeatability by the same human inspector or other inspectors.

These and other objects are achieved in one or more embodiments of the invention, wherein gas turbine engine generally ring-shaped dampening cone inner diameters, including those having spherical or other convex inner diameter surface profiles, are determined by placing the dampening cone in a fixture including a displacement indicator having an axis of displacement in alignment with a locating pin. The dampening cone inner diameter contacts a contact surface of the locating pin on one side and the indicator's displacement point on the other side. The indicator displacement is correlated with the dampening cone inner diameter. In dampening cones with convex surface profiles the indicator displacement point is located on the convex axial peak, which can be facilitated by using a knife edge displacement point. Dampening cone inner surface maximum diameter is obtained by swinging the dampening cone relative to the locating pin. Incremental swinging displacement is facilitated by fixture embodiments having at least one pusher assembly coupled to the fixture that abuts against an outer diameter surface of the dampening cone. An exemplary pusher embodiment includes a threaded screw for swinging the dampening cone. Embodiments of the methods and apparatus of the invention facilitate repeatable and accurate inspection of dampening cones, to determine their inner diameters and/or determine whether an inspected dampening cone is within tolerance specifications by comparison to a reference dampening cone.

Embodiments of the invention feature a method for determining internal diameter of a generally ring-shaped gas turbine engine dampening cone having an axial end surface and at least one inner diameter surface, by providing a measurement fixture defining a planar reference surface and having a locating pin projecting upwardly from the defined planar reference surface, with the locating pin defining a contact surface. The measurement fixture also has a displacement indicator, coupled to the measurement fixture, having a displaceable point defining a displacement axis that is aligned with the locating pin contact surface. A generally ring-shaped gas turbine engine dampening cone having an axial end surface and at least one inner diameter surface is placed on the fixture by circumscribing the locating pin contact surface and the displaceable point circumferentially within the dampening cone inner diameter surface and abutting the axial end surface against the planar reference surface. Dampening cone inner diameter is determined by correlating indicator displaceable point displacement position relative to the locating pin contact surface. For example, the indicator can be oriented and indexed in the fixture so that the displacement point reading on the indicator is correlated with linear distance between the point and the locating pin contact surface. Alternatively, the indicator can be oriented and indexed in the fixture so that the displacement point reading on the indicator displays variance from a desired reference distance.

Other embodiments of the invention feature a method for determining internal diameter of a generally ring-shaped gas turbine engine dampening cone having an axial end surface and a spherical or other convex profile inner diameter surface, by providing a measurement fixture defining a planar reference surface and having a locating pin projecting upwardly from the defined planar reference surface, the locating pin defining a contact surface. A displacement indicator is coupled to the measurement fixture, having a displaceable knife edge point with a linear edge oriented perpendicular to the planar reference surface and parallel to the locating pin contact surface. The displacement indicator defines a displacement axis that is aligned with the locating pin contact surface. The dampening cone is placed on the fixture by circumscribing the locating pin contact surface and the displaceable point knife edge circumferentially within the dampening cone inner diameter surface and abutting the axial end surface against the planar reference surface. The dampening cone inner diameter is determined by swinging the dampening cone relative to the locating pin in order to obtain a maximum inner diameter displacement reading with the indicator and correlating the indicator knife edge maximum diameter displacement position relative to the locating pin contact surface.

Additional embodiments of the invention feature an apparatus for determining internal diameter of a generally ring-shaped gas turbine engine dampening cone having an axial end surface and at least one inner diameter. The apparatus includes a base defining a planar reference surface and locating pin that projects upwardly from the defined planar reference surface. The locating pin defines a contact surface. A displacement indicator is coupled to base and has a displaceable point defining a displacement axis that is aligned with the locating pin contact surface. When using the apparatus a dampening cone internal diameter is determined by circumscribing the locating pin contact surface and the displaceable point circumferentially within a dampening cone inner diameter surface, while abutting an axial end surface of the dampening cone against the planar reference surface. The resulting indicator displaceable point displacement position relative to the locating pin contact surface is correlated with the measured dampening cone's internal diameter.

Embodiments of the apparatus also have a measuring plate coupled to the base at an inclined angle, with three reference buttons coupled to the measuring plate for abutment against a dampening cone axial end surface. Those reference buttons define the planar reference surface. Other embodiments also feature least one pusher assembly having a selectively translatable screw coupled to the measuring plate, for swinging the dampening cone relative to the locating pin by translating the screw in abutment with an outer diameter surface of the dampening cone, in order to obtain a maximum inner diameter displacement reading with the indicator. In other embodiments the indicator displaceable point has a knife edge point, which is suitable for measurement of dampening cones having convex profile inner diameter surfaces. Additional embodiments of the invention apparatus conveniently have two sets of locating pins and indicators, for measuring multiple inner diameters of dampening cones.

The respective objects and features of the present invention may be applied jointly or severally in any combination or sub-combination by those skilled in the art.

BRIEF DESCRIPTION OF THE DRAWINGS

The teachings of the various embodiments of the invention can be readily understood by considering the following detailed description in conjunction with the accompanying drawings, in which:

FIG. 1 shows an axial partial cross sectional view of a partially assembled known gas turbine rotor, with known ring-shaped dampening cones interposed between the rotor tie rod and turbine discs;

FIG. 2 is a detailed elevational view of the partially assembled rotor of FIG. 1, showing a known exemplary assembled dampening cone, rotor tie rod and pair of adjacent turbine discs;

FIG. 5 is a perspective view of another embodiment of an apparatus for determining internal diameter of a gas turbine engine dampening cone; and FIG. 6 is a side elevational view of the apparatus of FIG. 5.

To facilitate understanding, identical reference numerals have been used, where possible, to designate identical elements that are common to the figures.

DETAILED DESCRIPTION

Figure 3:
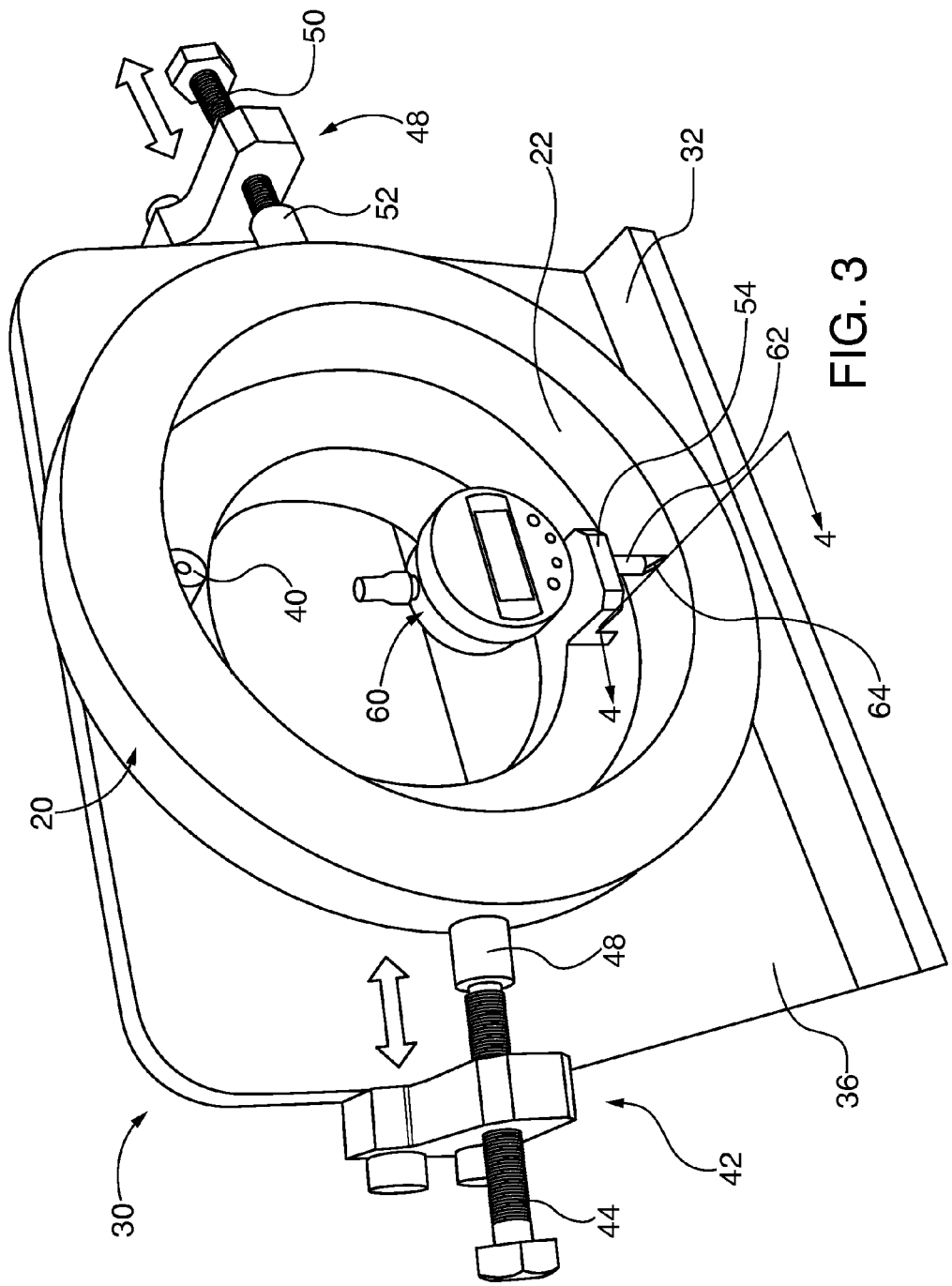
FIG. 3 is a perspective view of an embodiment of an apparatus performing an embodiment of a method for determining internal diameter of a gas turbine engine dampening cone.

After considering the following description, those skilled in the art will clearly realize that the teachings of various embodiments of the invention can be readily utilized to determine gas turbine engine dampening cone inner diameters, including those having spherical or other convex inner diameter surface profiles. Utilizing embodiments of the methods and apparatus concepts described herein, the inner diameter determined with a fixture including a displacement indicator having an axis of displacement in alignment with a locating pin. The dampening cone inner diameter is placed in contact with the locating pin on one side and a displacement point on the other side. The indicator displacement is correlated with the dampening cone inner diameter. In dampening cones with convex surface profiles the indicator displacement point is located on the convex axial peak, which can be facilitated by using a knife edge displacement point. Dampening cone inner surface maximum diameter is obtained by swinging the dampening cone relative to the locating pin. Incremental swinging displacement is facilitated by fixture embodiments having at least one pusher assembly coupled to the fixture that abuts against an outer diameter surface of the dampening cone. An exemplary pusher embodiment includes a threaded screw for swinging the dampening cone. Embodiments of the methods and apparatus of the invention facilitate repeatable and accurate inspection of dampening cones, to determine their inner diameters and/or determine whether an inspected dampening cone is within tolerance specifications by comparison to a reference dampening cone.

Referring to FIGS. 3-6, inner diameter $D_1$ of a known dampening cone 20 with a convex inner diameter surface profile 22 of radius R is determined at the maximum convex projection point 23 defined by the generally ring-shaped cone's inner diameter surface with an exemplary embodiment of a measurement fixture apparatus 30. The fixture 30 has a base plate 32, from which projects support ribs 34. An inclined measuring plate 36 is coupled to the base plate 32 and the support ribs 34 by weldments beads and/or fasteners. Three rest buttons 38 are coupled to the measuring plate 36 and mutually define a planar reference surface for abutment of an axial end surface of the dampening cone 20 that is placed within the fixture 30. A locating pin 40 is coupled to the upper end of the measuring plate 36 and defines a contact surface 41 for abutment against the dampening cone 20 inner diameter surface 22 at the ring-shaped cone's 12 o'clock circumferential position. The inclined measuring plate 36 orientations utilize gravitational force to bias the locating pin contact surface 41 firmly against the cone's inner diameter surface 22.

A dampening cone 20 placed on the fixture 30 is swung about the locating pin 40 in pendulum-like fashion, in order to register and align the cone's opposite side inner diameter surface vertically in the 12 o'clock circumferential position. Cone 20 pendulum-like swing orientation is precisely manipulated by at least one and preferably two pusher assemblies 42, 48 that flank the cone's outer diameter surface. In FIG. 3, left pusher assembly 42 includes threaded left screw 44 and left pusher 46 that has a face for abutment against an outer surface of the cone 20. Similarly, right pusher assembly 48 includes threaded right screw 50 and right pusher 52 that has a face for abutment against an outer surface of the cone 20. An additional advantage afforded by the use of opposed left and right pusher assemblies 42, 48 is that the measured cone 20 can be locked in a fixed swing position relative to the measuring plate 36 by abutting both the left and right pushers 48, 52 against the cone exterior surface.

Indicator holder 54 is coupled to the measuring plate 36 opposite and in line with the locating pin 40 and receives a split collet assembly 56 for passage and capture of a known displacement indicator 60. The exemplary known displacement indicator 60 shown in FIGS. 3 and 4 has a digital readout. Alternative known types of displacement indicators, such as analog dial indicators or transmitting indicators that transmit displacement data to a remote monitoring device may be substituted for the exemplary digital readout displacement indicator 60. The displacement indicator 60 has a displaceable spindle that defines a displacement axis indicated by the double arrow d of FIG. 5. The displacement axis d is aligned with the locating pin 40 contact surface 41. In the embodiment shown in FIGS. 5 and 6, a contact point extension 62 is affixed to the indicator 60 spindle and a knife edge displaceable point 64 is in turn affixed to the contact point extension.

Figure 4:
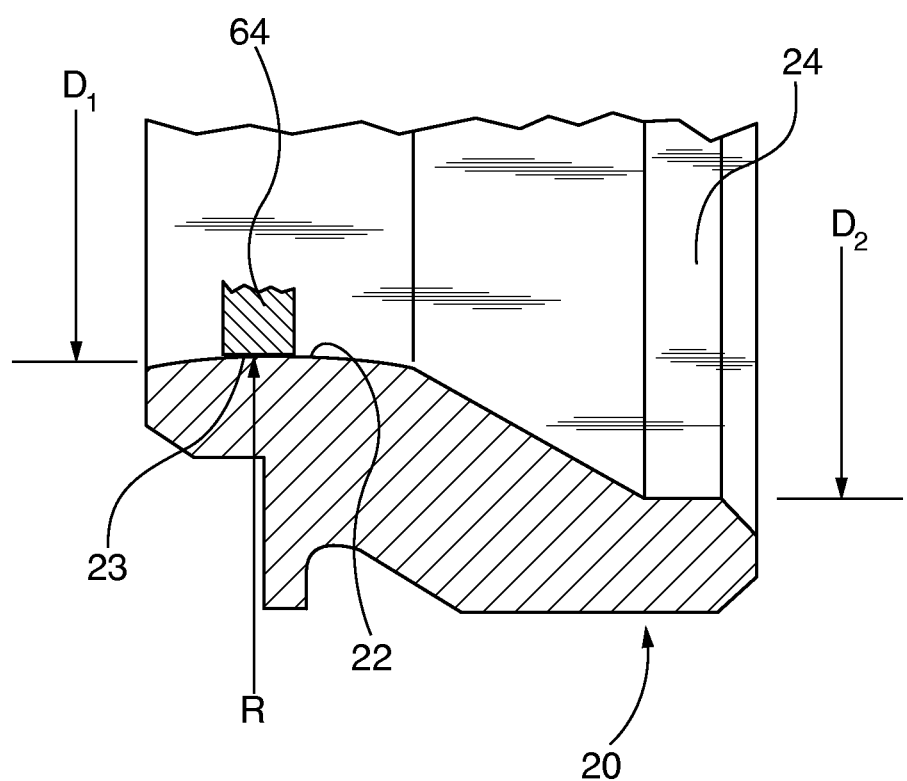
FIG. 4 is a cross sectional view of an embodiment of the apparatus of FIG. 3, taken along 4-4 thereof.

Referring to FIGS. 4 and 5, the knife edge point 64 is oriented relative to the dampening cone 20 convex inner diameter 22 surface profile so that the former's long axis, line-like edge is parallel to the axial dimension of the dampening cone and the locating pin 40 contact surface. In this way the line-like edge of the knife edge point 64 is tangential to the convex inner diameter surface high point 23. In this manner a precise linear distance D is defined between the locating pin 40 contact surface 41 and the distal end tip of the knife edge displacement point 64. Varying the displacement position of the displacement point distal tip 64 along the displacement axis d also varies the precise linear distance D between the contact surface 41 and the displacement point distal tip.

A dampening cone 20 inner diameter $D_1$ or $D_2$ is determined by placing it on the measurement fixture 30 embodiment of FIGS. 3 and 4, so that an axial face of the generally ring-shaped cone rests on the rest buttons 38 while circumscribing the locating pin contact surface 41 and the displaceable point 64 displacement tip circumferentially within the dampening cone inner diameter surface 22. In this manner the dampening cone abutting axial end is aligned parallel with the reference surface defined by the rest buttons 38, the opposed, oppositely directed locating pin contact surface 41 and the knife edge 64 are in contact with opposed sides of the dampening cone inner diameter surface (each respectively at the high point 23 if the surface is a convex surface). In this position the distance D between the locating pin contact surface and the knife edge 64 distal tip line-like edge correspond to the dampening cone inner diameter. The maximum diameter can be determined by swinging the dampening cone 20 relative to the locating pin 40 with the pushers 42, 48 until a maximum diameter reading is obtained.

Diameter concentricity can be inspected by rotating the dampening cone 20 relative to the measuring fixture 30 and obtaining corresponding diameter readings D at other circumferential locations. The indicator 60 can be oriented and indexed in the fixture 30, so that the displacement point 64 reading on the indicator are correlated with linear distance D between the point and the locating pin contact surface 41. Alternatively, the indicator 60 can be oriented and indexed in the fixture 30 so that the displacement point 64 displacement reading on the indicator 60 displays variance from a desired reference distance. The latter method advantageously provides a method for inspecting dampening cones 20 relative to a reference gage dampening cone. The dampening cone gage of known dimensions is inserted into the fixture 30 and inner diameter dimension D is obtained as described herein. The dimension D determined by the indicator 60 are recorded or the indicator is indexed to "zero" at that determined dimension. Subsequently the gage dampening cone is removed from the measurement fixture so that other dampening cone 20 internal diameters $D_1$ or $D_2$ can be determined. In a simplified inner diameter inspection mode wherein the indicator 60 displacement reading obtained from the reference gage dampening cone is zeroed, subsequently inspected dampening cones 20 can be accepted or rejected simply by determining whether the indicator 60 new displacement reading falls within a tolerance specification range for the component.

An alternative embodiment of a measurement fixture apparatus 30' is shown in FIG. 6. Here a pair of opposed, inclined measuring plates 36, 36' are affixed to the base 32 so that the inner diameters $D_1$ and $D_2$ of the dampening cone 20 can be measured conveniently on a common fixture. Respective corresponding components of each fixture are designated with pairs of common reference numbers, e.g., 38, 38', 40, 40', 60, 60', etc.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

What is claimed is:

1. A method for determining internal diameter of a ring-shaped, dampening cone for gas turbine engine, comprising:
   providing a measurement fixture, which includes:
      a base defining a self-standing, elevated, planar reference surface;
      a single locating pin projecting upwardly from an elevated upper end of the defined planar reference surface, the locating pin defining a single contact surface;
      a displacement indicator, coupled to base, having a displaceable point with a displacement range of motion below the contact surface of the locating pin, along a displacement axis that is parallel to the planar reference surface and aligned with the contact surface;
   resting an axial end surface of a ring-shaped dampening cone of a gas turbine engine upon the elevated, planar reference surface of the base, supported in an elevated position by hanging an inner radial surface of the dampening cone in abutting engagement with only the single locating pin's single contact surface, while an opposite side inner radial surface thereof abuts against and circumscribes the displacement indicator's displaceable point; and
   determining the dampening cone inner diameter by swinging, in pendulum-like fashion, the dampening cone relative to the locating pin single contact surface, the dampening cone inner diameter constituting distance from the locating pin's single contact surface to the displacement indicator maximum-extension displacement reading.

2. The method of claim 1, further comprising swinging the dampening cone relative to the locating pin in order to obtain a maximum inner diameter displacement reading with the indicator.

3. The method of claim 2, dampening cone swinging performed with at least one pusher assembly coupled to the measurement fixture that abuts against an outer diameter surface of the dampening cone.

4. The method of claim 3, further comprising the dampening cone swinging performed by providing first and second opposed pusher assemblies coupled to the measuring plate in opposed orientation, respectively having selectively translatable first and second opposed pusher screws for capturing and swinging the dampening cone relative to the single locating pin in pendulum-like fashion, by translating the respective pusher screws in abutment with an outer diameter surface of the dampening cone, in order to obtain a maximum inner diameter displacement reading with the indicator, and for selectively locking the dampening cone in a fixed rocking position there between.

5. The method of claim 1 the displaceable point comprising a knife edge point having a linear edge oriented parallel to the locating pin contact surface.

6. The method of claim 5 the knife edge point linear edge oriented perpendicular to the planar reference surface.

7. The method of claim 1, the planar reference surface defined by three reference buttons for abutment against the dampening cone axial end surface.

8. The method of claim 1, dampening cone inner diameter determined by:
   placing a reference dampening cone gage on the fixture and determining a displaceable point reference maximum-extension displacement reading;
   replacing the reference dampening cone gage with an inspected dampening cone on the fixture and determining a second displacement point maximum-extension displacement reading; and
   comparing the reference and second displacement maximum-extension displacement readings.

9. A method for inspecting dampening cone inner diameter using the method of claim 8 by:
   comparing reference and second maximum-extension displacement readings;
   designating the inspected dampening cone as meeting inner diameter specification if the reference and second maximum-extension displacement reading are within a permissible specification tolerance variance; and
   failing the inner diameter specification if the reference and second maximum-extension displacement readings are outside the permissible specification tolerance variance.

10. The method of claim 1, further comprising determining internal diameter at a plurality of circumferential positions about the dampening cone.

11. An apparatus for determining an inner diameter of a ring-shaped, dampening cone for gas turbine engine, comprising:
   a base defining a self-standing, elevated, planar reference surface;
   a single locating pin projecting upwardly from an elevated upper end of the defined planar reference surface, the locating pin defining a single contact surface;
   a displacement indicator, coupled to base, having a displaceable point with a displacement range of motion below the contact surface of the locating pin, along a displacement axis that is parallel to the planar reference surface and aligned with the contact surface;
   the apparatus determining an inner diameter of a ring-shaped, dampening cone for gas turbine engine when an axial end surface of the dampening cone rests upon the elevated, planar reference surface of the base, supported in an elevated position by hanging an inner radial surface of the dampening cone in abutting engagement with only the single locating pin's single contact surface, while an opposite side inner radial surface thereof abuts against and circumscribes the displacement indicator's displaceable point, the dampening cone inner diameter constituting distance from the locating pin's single contact surface to the displacement indicator maximum-extension displacement reading, as the dampening cone swings on the single contact surface, in pendulum-like fashion.

12. The apparatus of claim 11, further comprising:
   a measuring plate coupled to the base at an inclined angle;
   three reference buttons coupled to the measuring plate for abutment against a dampening cone axial end surface, the reference buttons defining the planar reference surface.

13. The apparatus of claim 12, further comprising at least one pusher assembly having a selectively translatable pusher screw coupled to the measuring plate, for swinging the dampening cone relative to the locating pin in pendulum-like fashion, by translating the pusher screw in abutment with an outer diameter surface of the dampening cone, in order to obtain a maximum inner diameter displacement reading with the indicator.

14. The apparatus of claim 13, further comprising first and second opposed pusher assemblies coupled to the measuring plate in opposed orientation, respectively having selectively translatable first and second opposed pusher screws for capturing and swinging the dampening cone relative to the single locating pin in pendulum-like fashion, by translating the respective pusher screws in abutment with an outer diameter surface of the dampening cone, in order to obtain a maximum inner diameter displacement reading with the indicator, and for selectively locking the dampening cone in a fixed rocking position there between.

15. The apparatus of claim 12, further comprising the single locating pin coupled to the measuring plate and the indicator coupled to the measuring plate by an indicator holder and split collar.

16. The apparatus of claim 11, the displaceable point comprising a knife edge point having a linear edge oriented parallel to the locating pin contact surface.

17. The apparatus of claim 16, the knife edge point linear edge oriented perpendicular to the planar reference surface.

18. The apparatus of claim 11, further comprising:
- first and second measuring plates coupled to the base at an inclined angle;
- three reference buttons coupled to each respective measuring plate for abutment against a dampening cone axial end surface, the reference buttons defining respective first and second planar reference surfaces;
- respective first and second single locating pins projecting upwardly from the respective first and second planar reference surfaces, each respective locating pin defining a contact surface; and
- respective first and second displacement indicators respectively coupled to its respective first and second measuring plates; each indicator having a displaceable point defining a displacement axis that is aligned with its respective locating pin contact surface.

* * * * *